(12) United States Patent
Sejnoha et al.

(10) Patent No.: US 6,606,594 B1
(45) Date of Patent: Aug. 12, 2003

(54) WORD BOUNDARY ACOUSTIC UNITS

(75) Inventors: Vladimir Sejnoha, Cambridge, MA (US); Tom Lynch, Framingham, MA (US); Ramesh Sarukkai, Billerica, MA (US)

(73) Assignee: ScanSoft, Inc., Peabody, MA (US)

( * ) Notice: Subject to any disclaimer, the term of this patent is extended or adjusted under 35 U.S.C. 154(b) by 0 days.

(21) Appl. No.: 09/408,388

(22) Filed: Sep. 29, 1999

Related U.S. Application Data

(60) Provisional application No. 60/102,373, filed on Sep. 29, 1998.

(51) Int. Cl.$^7$ .............................................. G10L 15/06
(52) U.S. Cl. ...................................... 704/250; 704/257
(58) Field of Search ................................ 704/231, 232, 704/242, 243, 245, 256, 257

(56) References Cited

U.S. PATENT DOCUMENTS

| | | | | |
|---|---|---|---|---|
| 4,513,435 A | * | 4/1985 | Sakoe et al. ................. | 704/256 |
| 5,502,790 A | * | 3/1996 | Yi ............................... | 704/256 |
| 5,581,655 A | | 12/1996 | Cohen et al. .............. | 395/2.54 |
| 5,812,974 A | | 9/1998 | Hemphill et al. ........... | 704/256 |
| 5,819,221 A | * | 10/1998 | Kondo et al. ................ | 704/256 |
| 5,937,384 A | * | 8/1999 | Huang et al. ............... | 704/256 |
| 6,163,769 A | * | 12/2000 | Acero et al. ................. | 704/260 |

OTHER PUBLICATIONS

Chris Rowden editor "speech processing" 1992.*

Chou, W, et al, "An Algorithm of High Resolution and Efficient Multiple String Hypothesization for Continuous Speech Recognition Using Inter–Word Models", *Proceedings on the International Conference on Acoustics, Speech, and Signal Processing, IEEE*, NY, vol. CONF. 19, 1994, pp. 153–156.

Giachin, E, et al, "Word Juncture Modeling Using Inter–Word Context–Dependent Phone–Like Units", *CSELT Technical Reports*, vol. XX, No. 1, Mar., 1992, pp. 43–47.

Kondo, et al, "Clustered Inter–Phrase or Word Contest–Dependent Models for Continuously Read Japanese", *Database Inspec 'Online', Institute of Electrical Engineers, Stevenage*, Database Accession No. 5103419 XP002129383 abstract and *J. Acoust. Soc. JNP, Journal of Acoustical Society of Japan*, Sep. 1995, Japan, vol. 16, No. 5, pp. 299–310.

Nitta, T., et al, "Word–Spotting Based on Inter–Word and Intra–Word Diphone Models", *processing ICSLP 96, fourth International Conference on Spoken Language Processing*, Cat. No. 96TH8206, Proceedsings on fourth International Conference on Spoken Language Processing, ICSLP '96, Oct. 3–6, 1996, pp. 1093–1096.

* cited by examiner

*Primary Examiner*—Daniel Abebe
(74) *Attorney, Agent, or Firm*—Bromberg & Sunstein, LLP

(57) ABSTRACT

A speech recognition system recognizes an input utterance of spoken words. The system includes a set of word models for modeling vocabulary to be recognized, each word model being associated with a word in the vocabulary, each word in the vocabulary considered as a sequence of phones including a first phone and a last phone, wherein each word model begins in the middle of the first phone of its associated word and ends in the middle of the last phone of its associated word; a set of word connecting models for modeling acoustic transitions between the middle of a word's last phone and the middle of an immediately succeeding word's first phone; and a recognition engine for processing the input utterance in relation to the set of word models and the set of word connecting models to cause recognition of the input utterance.

36 Claims, 2 Drawing Sheets

WORD BOUNDARY ACOUSTIC UNITS

The present application claims priority from U.S. provisional application No. 60/102,373, filed Sep. 29, 1998, which is hereby incorporated herein by reference.

TECHNICAL FIELD

The present invention relates to speech recognition systems, and more particularly to the recognition models they use.

BACKGROUND ART

State-of-the-art speech recognition systems make use of context-dependent sub-word models to represent the system vocabulary. These models represent phones in the context of other phones, so as to capture the effects of coarticulation between adjacent phones in spoken language. Dealing with coarticulation effectively is crucial—systems which do not do so, and rely on context-independent models grossly underperform systems with context-dependent models.

One type of model frequently used to deal with coarticulation is the triphone. A triphone model for a particular phone P will be conditioned on both the preceding and following phonetic context. For example, A–P+B would be the triphone model for phone P with the left context of phone A and the right context of phone B. It is effectively impossible to train and use triphones involving all phone combinations. Nevertheless, the repertory of such units used in typical speech recognition systems is large.

A particular problem arises in the recognition of continuous speech, where words are spoken without pauses between them. Coarticulation effects cross word boundaries, and to maximize system performance, models should be utilized which reflect the effect that the phones in a preceding word have on the phones in the following word and vice versa.

Such "cross-word-boundary" units have a significant effect on the computational load of a continuous speech recognition system. In principle, in a dictation system, each vocabulary word must be able to connect to every other vocabulary word. Thus, at the end of each hypothesized word, the system must consider all the words in the vocabulary as potential successors, and must thus connect the current word to all these potential followers using the appropriate connecting units. Inter-word connections present a particularly serious computational challenge to large vocabulary continuous speech recognition (LVCSR) systems, because at this point in the extension of hypotheses, little acoustic information about the identity of the following word is available, and thus it is difficult to apply aggressive thresholding and pruning schemes which are typically used to limit the overall computation within words.

Consider the following example involving within-word and cross-word triphone models. To connect a word which ends with the phones B and C to a following word which begins with the phones D and E:

. . . A B C→D E F . . . , means that the last phone model of the first word and the first phone model of the second word have to be cross-word triphones:

. . . A–B+C B–C+#D→C#–D+E D–E+F . . . , where # denotes a word boundary. Thus, the last triphone of the first word, and the first triphone of the second word depend on the second and first words respectively. The full set of connecting units for a given vocabulary word can be expressed as follows:

1.) A first set of cross word triphones connecting the given word to all possible following phonetic contexts of which there are P (B–C+#D in the above example).

2.) For each of these units there is a further set connecting the last phone of the first word to all the valid pairs of the first two phones of following words in the vocabulary, of which there are p (C#–D+E in the above example).

Thus, in a full triphone model system, each vocabulary word requires P(1+p) segments to connect it to all following vocabulary words. In a typical system with a vocabulary of several 10's of thousands of words, P may be on the order of 50, while p may be on the order of the 15, resulting in on the average 800 connecting units requiring activation for each vocabulary word.

SUMMARY OF THE INVENTION

A preferred embodiment of the present invention provides a speech recognition system for recognizing an input utterance of spoken words. The system includes a set of word models for modeling vocabulary to be recognized, each word model being associated with a word in the vocabulary, each word in the vocabulary considered as a sequence of phones including a first phone and a last phone, wherein each word model begins in the middle of the first phone of its associated word and ends in the middle of the last phone of its associated word; a set of word connecting models for modeling acoustic transitions between the middle of a word's last phone and the middle of an immediately succeeding word's first phone; and a recognition engine for processing the input utterance in relation to the set of word models and the set of word connecting models to cause recognition of the input utterance.

In a further embodiment, each word model uses context-dependent phone models, e.g., triphones, to represent the sequence of phones. The acoustic transitions modeled may include a pause, a period of silence, or a period of noise. Each word connecting model may further include a previous word identification field which represents the word associated with the word model immediately preceding the word connecting model, an ending score field which represents a best score from the beginning of the input utterance to reach the word connecting model, or a type field which represents specific details of the word connecting model.

A preferred embodiment also includes a method of a speech recognition system for recognizing an input utterance of spoken words. The method includes modeling vocabulary to be recognized with a set of word models, each word model being associated with a word in the vocabulary, each word in the vocabulary being considered as a sequence of phones including a first phone and a last phone, wherein each word model begins in the middle of the first phone of its associated word and ends in the middle of the last phone of its associated word; modeling acoustic transitions between the middle of a word's last phone and the middle of an immediately succeeding word's first phone with a set of word connecting models; and processing with a recognition engine the input utterance in relation to the set of word models and the set of word connecting models to cause recognition of the input utterance.

In a further embodiment, each word model uses context-dependent phone models, e.g., triphones, to represent the sequence of phones. The acoustic transitions may further include a pause, a period of silence, or a period of noise. Each word connecting model may further include a previous word identification field which represents the word associated with the word model immediately preceding the word connecting model, an ending score field which represents a best score from the beginning of the input utterance to reach the word connecting model, or a type field which represents specific details of the word connecting model.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Figure 1:
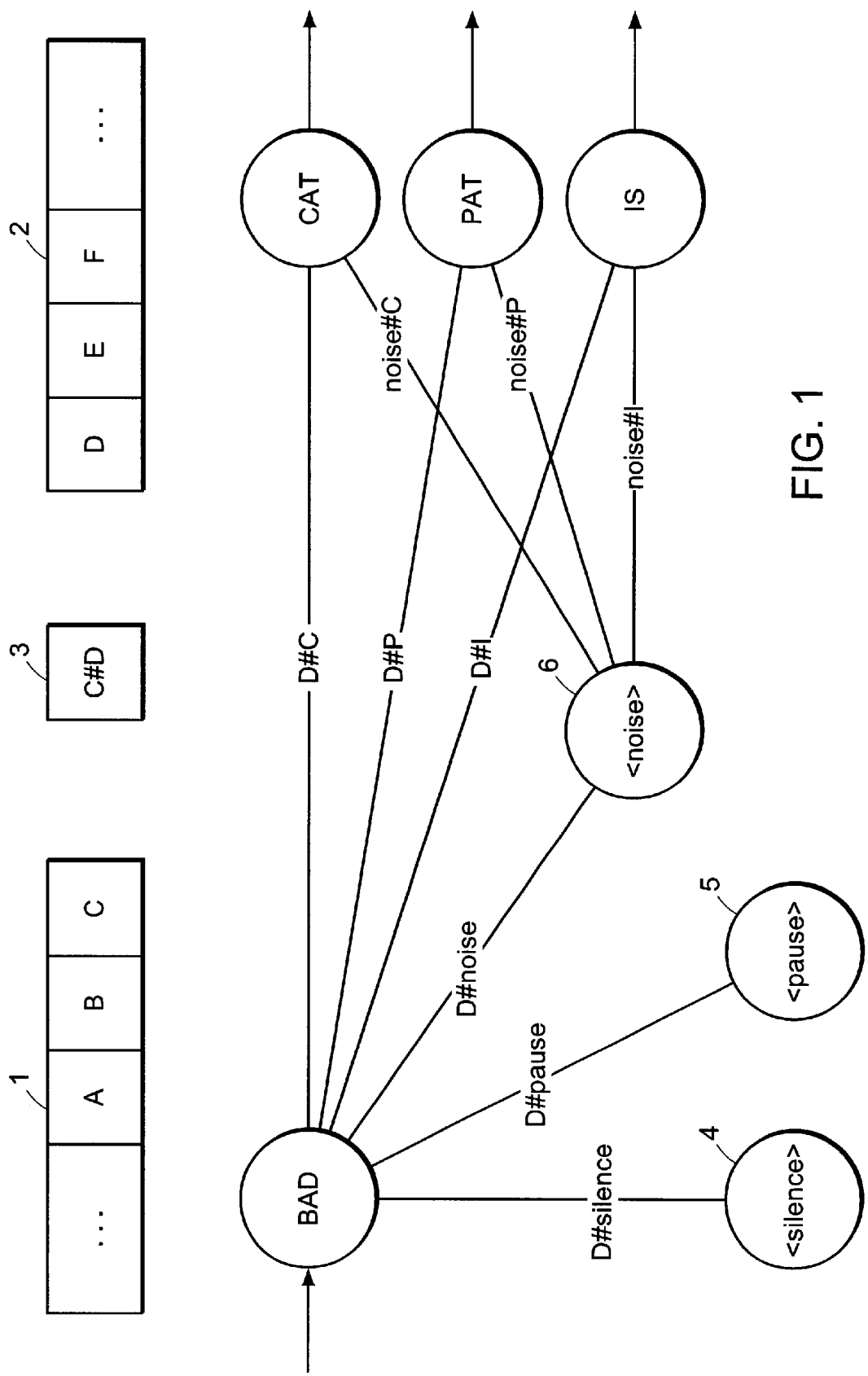
FIG. 1 illustrates glues according to a preferred embodiment of the present invention.

To cut down on the amount of computation during the connection of words, a preferred embodiment of the present invention simplifies the inter-word connecting models from triphones to diphones. Such inter-word diphone models, also referred to as "glues," are based on the assumption that coarticulation has relatively little effect across phone cores. Thus, as shown in FIG. 1 in the context of the phone sequence A B C of the left word model 1, the transition between the phones A and B is relatively unaffected by the following phone C. The merit of this assumption has been empirically confirmed in speech recognition experiments.

Thus, a preferred embodiment defines a new set of word-connecting units having the full set of cross-boundary diphones, denoted in FIG. 1, for example, by glue 3 C#D. Unlike triphones, the segment boundaries of diphones occur in phone core centers. Therefore, the use of such connecting units places a special constraint on the last phone models and the first phone models of word models, in that these must represent only the first and last half of the respective phone. Thus, in the example in FIG. 1:

. . . A B C→DEF . . .

The left word model 1 must end in the middle of the phone C, and the right word model 2 must begin in the middle of the phone D. The inter-word connection, glue 3, would thus be made as follows:

. . . C1 C#D D2 . . .

Thus, the left word model 1 ends in the middle of the phone C (denoted as C1, to indicate that only the first half of this phone is in fact modeled), followed by the cross-word-boundary diphone C#D, glue 3, which connects into the right word model 2, which begins in the middle of the phone D (denoted by D2, to indicate that only the second half of this phone is modeled here).

Note that provided the above constraint on the first and last phone model in the word model is satisfied, the diphone connecting units become compatible with all types of word models, including those using triphones. There is no particular requirement on what type of phone models are used internally within the word models. Besides triphone models, other forms of wider- or narrower-context models could be used. In fact, a word-specific state sequence model custom to a particular word could be used.

The number of cross-word boundary units needed to connect a particular word to all other vocabulary words is simply P. The use of diphone cross-word-boundary connecting units thus results in a p-fold reduction (typically, fifteen times reduction) in the number of units that need to be evaluated at each word end, with negligible reduction in modeling accuracy.

The concept of glues is further illustrated in FIG. 1. As described above, a glue can be written as A#B representing that the glue is between words ending in A and beginning in B. FIG. 1 also depicts special glues 4–6 are included for transitions to noise and silence. The special glues 4–6 shown in FIG. 1 are broken into two parts: one set of glues connect the word end to the special contexts of silence 4, pause 5, or noise 6; another set of glues connects the special contexts to the word starting phones.

Figure 2:
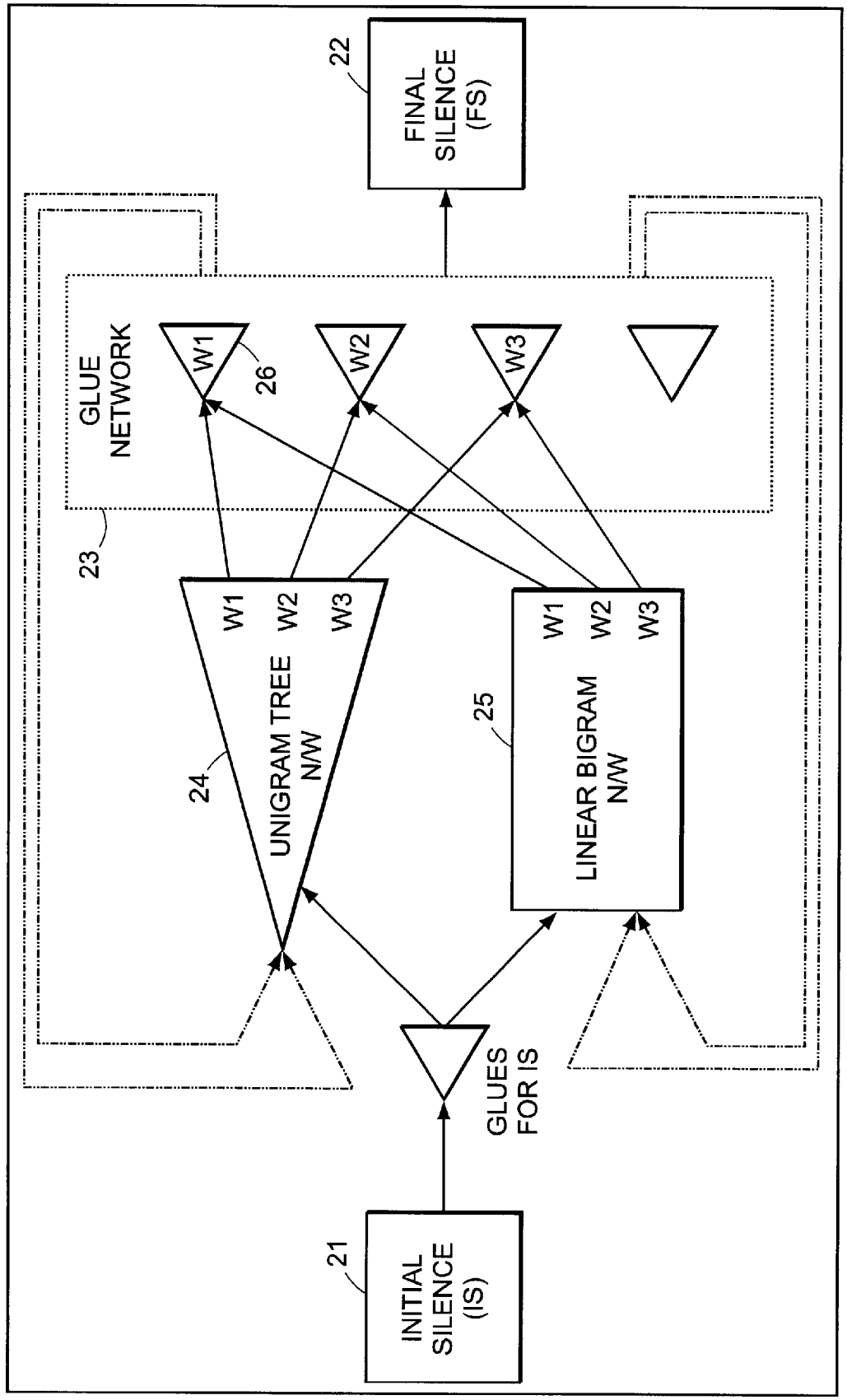
FIG. 2 illustrates the use of glues in the first search pass of a speech recognition system according to a preferred embodiment.

In a preferred embodiment as shown in FIG. 2, glues may be used as part of a three-pass speech recognition system. The first pass quickly reduces the number of word hypotheses, and finds reasonable "word starting times". The second pass does an A* like search starting from the end of the speech utterance and using the "word starting" information provided by the first pass, and generates the word graph. The third pass trigramizes the word graph produced by the second pass, and determines the N-best hypotheses.

The first pass search is managed by breaking up the search using different networks: initial silence network 21, final silence network 22, glue network 23, unigram tree network 24, and bigram linear network 25. The glue network 23 manages and decodes the glue models described above. Initial silence and final silence refer to models trained to represent the silence regions at the beginning and ends of utterances.

The connecting glue network 23 acoustically matches every transition between two words. The glue network 23 connects back to the bigram linear network 25, or the unigram tree network 24 or to final silences 22. In order to carry context of the previous word to the linear network 25 (where the bigram scores are determined and applied), the glues 26 in the glue network 23 carry the predecessor word information: i.e., each ending word has its own unique set of glues 26. If the same word ends in both the bigram linear network 25 and unigram tree network 24, then the outgoing scores from the two instances of the same word are minimized, and serve as the incoming score of the glue network 26 for that word.

The first pass stores the following 4-tuple information at the end of every active glue 26, for every time:

<Glue ID, Previous Word ID, Ending Score, GlueTypeFlag>

The glue ID corresponds to the actual diphone segment representing that particular glue 26. The "Previous Word ID" refers to the word that the glue 26 started from. The Ending Score is the best score from the beginning of the utterance to reach this glue 26 at this time through the appropriate word context. The Glue Type Flag is used to refer to the details of the glue 26: whether it was a normal glue, or whether it had a pause core embedded within it and so on.

The second pass uses this information stored at the ends of glues 26 in the first pass to do an A* like backward-in-time search to generate a word graph. The second pass starts by extending the final silence models 22, and determines valid starting times. For each of those times, the glue end table stored in the first pass is looked up, and the first pass estimate of the score from the beginning of the utterance to that point is extracted. The sum of the first pass estimate and the second pass backward score (there is also a bigram language model score that has to be added in) constitutes the estimated total hypothesis score which is stored along with the hypothesis that pushed on to a search stack. The best hypothesis is popped off the stack and the extensions continued till every hypothesis either reaches initial silence 22 or is pruned out (the threshold for pruning is an second pass offset plus the best first pass score to exit the final silence model for the whole utterance). The term "estimate" is used since the first pass uses various approximations to speed up the process, whereas the second pass uses more exact models.

One of the key issues with glues 26 in the above architecture is that glues 26 are word conditioned. This is necessary to propagate the previous word context so that bigram language models may be applied when entering the linear network 25. Thus, the glues 26 themselves "carry" the previous word context information. This leads to an explosion in the number of glues 26 that need to be dealt with in the LVCSR search, both in terms of computation and memory.

In addition, the process of extending from a glue 26 to the beginning of the next word is also computationally expensive. This is because, for every glue 26, the bigram followers of the "previous word" have to be examined, thresholded, and perhaps new arcs activated for the following words. In order to speedup such "computationally expensive" extensions, approximations have been introduced into the glue extensions. In addition, the matching arcs in the unigram tree network 24 that start with the ending phone context of the glues 26 also need to be "activated".

In order to alleviate the computational costs of extending at the end of glues 26 and connecting to the linear bigram network 25 and to the unigram tree network 24, the glue extensions may be approximated to every other time frame. In other words, glues 26 can connect to following words only every other time frame. This approximation speeds up the system, while not affecting accuracy much.

There are some changes that are needed in the second pass to accommodate such an approximate glue ending score from the first pass. The second pass uses a threshold offset of the best score provided by the first pass. However, since the first pass "best" score is only approximate, as hypotheses are extended right-to-left, the second pass will have the exact scores (i.e. without the glue extension approximations used in the first pass). Thus, the effective best score varies as the second pass processes word arcs from right to left. In order to cope up with the scenario of varying thresholds in the second pass, a threshold is set for every time in the second pass. The constraint that the threshold is monotonically decreasing from right to left (in time) is enforced at the end of every second pass extension. This allows the second pass to always use the best possible threshold (so far) at any given time. The threshold for every time is initialized to the first pass "best" score plus the second pass threshold offset.

Two aspects of glues 26 make them difficult to handle in a large vocabulary search:

1) The high density of glues 26 unfairly lets them dominate many parts of the search, and
2) The lack of language model scores at glues 26 generally makes them better scoring than competing segments from the unigram tree 24 and linear network 25 (many of which have language model increments applied at that time).

Various experiments have been attempted, rather unsuccessfully, where the "best possible" language model scores are propagated to the glues. The high density of the glues 26 is inevitable, every word end spawns glue starting segments, roughly equal to the number of phones. This doubles when pause glue extensions survive to spawn another set of glue fragments.

One idea that was effective in managing the sheer number and lack of language model scores in the glue network 23 was the separation of the active arcs allocated to the glue network 23. The allowed active arc fraction was divided into three parts (although variations were tried). The most effective split was when the glues 26 were isolated from the rest of the networks, and each network allocated its own resources. Thus, a separate score histogram was maintained for the glues 26, and a separate histogram threshold was determined to decide which active glue arcs to prune out. This is effective only in a dictation context, since command networks do not operate with histogram pruning, and work off standard fixed thresholds.

Given that the glues in a preferred embodiment are context-dependent (i.e. carry previous word identity), the number of possible glues is theoretically equal to the number of words times the number of glues that can connect from that word (roughly for a 30 k system, 30 k*80=2.4 Million glues). It is, therefore, important to design methods where glues can be dynamically allocated and removed, in a fast and efficient manner.

There are two different algorithms that have been effective: dynamic reusing of glues and dynamic pause glue extensions. In the former, a list of unused, allocated glue models is maintained. Whenever, a new set of glues is needed, the list is searched for a set of unused glues with the same ending context as the current word context that is requesting the set of glues. If found, this is reused, else a new set of glues is reallocated. Due to the short life spans of most glues, this algorithm is quite effective. The second idea is the dynamic allocation of pause glues. In this scheme, the glue subnetwork corresponding to the pause extensions of the glues are not actually allocated till the end of the first half of the pause glue is reached. In many cases, the first half of the pause glue is itself pruned out, thus enabling the dynamic allocation of the pause extensions save unwanted memory allocations.

Other ideas are suggested by the concept of glues, such as the use of detailed glues for the second search pass. Simplified glues (i.e., context-independent) can be used in the first search pass, and more detailed glues (i.e.,context-dependent) in the second pass. Such a system is sensitive to the quality of the glues in the first pass, and search thresholds may have to be wide open in order to cope up with the loss of discrimination of the "poor" models used in the first pass.

Another possibility is the use of single state collapsed models. This refers to the idea of collapsing all the states of all the segments, and using such models in the first pass. The idea is to speedup operation by making the updates much faster. Initial results have been promising in systems with wide-open parameters, although some issues remain to be addressed.

Language model look ahead and glue look ahead schemes can also be considered in glues, although more work remains to be done in this area. Similarly, "anti-glues" may be considered to move out the beginning and ends of words into a separate network, and elimination of the glue concept. Presently, however, this increases dramatically the complexity of the system with such a change. Further glue sharing allows words that have the same language model identification and the same word ending phone context to share glues. Methods for extending the glues for modeling liaisons are also under investigation.

What is claimed is:

1. A speech recognition system for recognizing an input utterance of spoken words, the system comprising:
   a set of word models for modeling vocabulary to be recognized, each word model being associated with a word in the vocabulary, each word in the vocabulary considered as a sequence of phones including a first phone and a last phone, wherein each word model begins in the middle of the first phone of its associated word and ends in the middle of the last phone of its associated word;
   a set of word connecting models for modeling acoustic transitions between the middle of a word's last phone and the middle of an immediately succeeding word's first phone; and
   a recognition engine for processing the input utterance in relation to the set of word models and the set of word connecting models to cause recognition of the input utterance.

2. A system as in claim 1, wherein each word model uses context-dependent phone models to represent the sequence of phones.

3. A system as in claim 2, wherein the context-dependent phone models are triphones.

4. A system as in claim 1, wherein the acoustic transitions include a pause.

5. A system as in claim 1, wherein the acoustic transitions include a period of silence.

6. A system as in claim 1, wherein the acoustic transitions include a period of noise.

7. A system as in claim 1, wherein each word connecting model further includes a previous word identification field which represents the word associated with the word model immediately preceding the word connecting model.

8. A system as in claim 1, wherein each word connecting model further includes an ending score field which represents a best score from the beginning of the input utterance to reach the word connecting model.

9. A system as in claim 1, wherein each word connecting model further includes a type field which represents specific details of the word connecting model.

10. A method of a speech recognition system for recognizing an input utterance of spoken words, the method comprising:

modeling vocabulary to be recognized with a set of word models, each word model being associated with a word in the vocabulary, each word in the vocabulary being considered as a sequence of phones including a first phone and a last phone, wherein each word model begins in the middle of the first phone of its associated word and ends in the middle of the last phone of its associated word;

modeling acoustic transitions between the middle of a word's last phone and the middle of an immediately succeeding word's first phone with a set of word connecting models; and processing with a recognition engine the input utterance in relation to the set of word models and the set of word connecting models to cause recognition of the input utterance.

11. A method as in claim 10, wherein each word model uses context-dependent phone models to represent the sequence of phones.

12. A method as in claim 11, wherein the context-dependent phone models are triphones.

13. A method as in claim 10, wherein the acoustic transitions include a pause.

14. A method as in claim 10, wherein the acoustic transitions include a period of silence.

15. A method as in claim 10, wherein the acoustic transitions include a period of noise.

16. A method as in claim 10, wherein each word connecting model further includes a previous word identification field which represents the word associated with the word model immediately preceding the word connecting model.

17. A method as in claim 10, wherein each word connecting model further includes an ending score field which represents a best score from the beginning of the input utterance to reach the word connecting model.

18. A method as in claim 10, wherein each word connecting model further includes a type field which represents specific details of the word connecting model.

19. An improved speech recognition system of the type employing word models, wherein the improvement comprises:

a set of word models for modeling vocabulary to be recognized, each word model being associated with a word in the vocabulary, each word in the vocabulary considered as a sequence of phones including a first phone and a last phone, wherein each word model begins in the middle of the first phone of its associated word and ends in the middle of the last phone of its associated word; and a set of word connecting models for modeling acoustic transitions between the middle of a word's last phone and the middle of an immediately succeeding word's first phone.

20. A system as in claim 19, wherein each word model uses context-dependent phone models to represent the sequence of phones.

21. A system as in claim 20, wherein the context-dependent phone models are triphones.

22. A system as in claim 19, wherein the acoustic transitions include a pause.

23. A system as in claim 19, wherein the acoustic transitions include a period of silence.

24. A system as in claim 19, wherein the acoustic transitions include a period of noise.

25. A system as in claim 19, wherein each word connecting model further includes a previous word identification field which represents the word associated with the word model immediately preceding the word connecting model.

26. A system as in claim 19, wherein each word connecting model further includes an ending score field which represents a best score from the beginning of the input utterance to reach the word connecting model.

27. A system as in claim 19, wherein each word connecting model further includes a type field which represents specific details of the word connecting model.

28. An improved method of a speech recognition system for recognizing an input utterance of spoken words, the improvement comprising:

modeling vocabulary to be recognized with a set of word models, each word model being associated with a word in the vocabulary, each word in the vocabulary being considered as a sequence of phones including a first phone and a last phone, wherein each word model begins in the middle of the first phone of its associated word and ends in the middle of the last phone of its associated word; and modeling acoustic transitions between the middle of a word's last phone and the middle of an immediately succeeding word's first phone with a set of word connecting models.

29. A method as in claim 28, wherein each word model uses context-dependent phone models to represent the sequence of phones.

30. A method as in claim 29, wherein the context-dependent phone models are triphones.

31. A method as in claim 28, wherein the acoustic transitions include a pause.

32. A method as in claim 28, wherein the acoustic transitions include a period of silence.

33. A method as in claim 28, wherein the acoustic transitions include a period of noise.

34. A method as in claim 28, wherein each word connecting model further includes a previous word identification field which represents the word associated with the word model immediately preceding the word connecting model.

35. A method as in claim 28, wherein each word connecting model further includes an ending score field which represents a best score from the beginning of the input utterance to reach the word connecting model.

36. A method as in claim 28, wherein each word connecting model further includes a type field which represents specific details of the word connecting model.

* * * * *